(12) United States Patent
Li et al.

(10) Patent No.: US 11,247,197 B1
(45) Date of Patent: Feb. 15, 2022

(54) CORE-SHELL STRUCTURED CATALYST, PREPARATION METHOD THEREOF AND METHOD FOR TREATING INDUSTRIAL TAIL GAS

(71) Applicant: Kunming University of Science and Technology, Kunming (CN)

(72) Inventors: Kai Li, Kunming (CN); Yaxi Zhang, Kunming (CN); Ping Ning, Kunming (CN); Chi Wang, Kunming (CN); Fei Wang, Kunming (CN); Xin Sun, Kunming (CN); Yixing Ma, Kunming (CN); Xin Song, Kunming (CN); Qian Li, Kunming (CN)

(73) Assignee: KUNMING UNIVERSITY OF SCIENCE AND TECHNOLOGY, Kunming (CN)

( * ) Notice: Subject to any disclaimer, the term of this patent is extended or adjusted under 35 U.S.C. 154(b) by 0 days.

(21) Appl. No.: 17/137,028

(22) Filed: Dec. 29, 2020

(30) Foreign Application Priority Data

Nov. 11, 2020 (CN) .......................... 202011250406.7

(51) Int. Cl.
| | | |
|---|---|---|
| *B01D 53/86* | (2006.01) | |
| *B01J 21/08* | (2006.01) | |
| *B01J 29/46* | (2006.01) | |
| *B01J 35/02* | (2006.01) | |
| *B01J 37/02* | (2006.01) | |
| *B01J 37/08* | (2006.01) | |

(52) U.S. Cl.
CPC .......... *B01J 29/46* (2013.01); *B01D 53/8621* (2013.01); *B01D 53/8671* (2013.01); *B01J 21/08* (2013.01); *B01J 35/026* (2013.01); *B01J 37/0219* (2013.01); *B01J 37/0223* (2013.01); *B01J 37/0228* (2013.01); *B01J 37/0244* (2013.01); *B01J 37/088* (2013.01); *B01D 2255/2065* (2013.01); *B01D 2255/20738* (2013.01); *B01D 2255/30* (2013.01); *B01D 2255/504* (2013.01); *B01D 2255/9022* (2013.01); *B01D 2257/408* (2013.01); *B01D 2257/553* (2013.01)

(58) Field of Classification Search
CPC .... B01D 53/54; B01D 53/64; B01D 2255/30; B01D 2255/40; B01D 2255/50; B01D 2255/9022; B01D 2257/408; B01D 2257/60; B01J 23/002; B01J 29/00; B01J 35/0006; B01J 35/008; B01J 35/0086; B01J 37/00; B01J 37/0215
See application file for complete search history.

(56) References Cited

U.S. PATENT DOCUMENTS

| | | | |
|---|---|---|---|
| 5,228,980 A * | 7/1993 | Stockwell | B01J 29/084 208/118 |
| 10,016,750 B1 * | 7/2018 | Al-Khattaf | C07C 4/06 |
| 2019/0126247 A1 * | 5/2019 | Deeba | B01J 23/46 |

* cited by examiner

*Primary Examiner* — Timothy C Vanoy
(74) *Attorney, Agent, or Firm* — Fish IP Law LLP (57) ABSTRACT

The present disclosure relates to the technical field of industrial waste gas purification, in particular to a core-shell structured catalyst, a preparation method and use thereof. The present disclosure provides a core-shell structured catalyst including a metal oxide-molecular sieve as a core and porous silica ($SiO_2$) as a shell, where the metal oxide-molecular sieve includes a molecular sieve and a metal oxide loaded on the molecular sieve, the metal oxide includes an oxide of a first metal and an oxide of a second metal, the first metal is Fe, Cu, Ti, Ni or Mn, and the second metal is Ce or La. The core-shell structured catalyst of the present disclosure can enable effective removal of HCN and $AsH_3$ at the same time with a stable effect, and no secondary pollution.

20 Claims, 3 Drawing Sheets

CORE-SHELL STRUCTURED CATALYST, PREPARATION METHOD THEREOF AND METHOD FOR TREATING INDUSTRIAL TAIL GAS

TECHNICAL FIELD

The present disclosure relates to the technical field of industrial waste gas purification, in particular to a core-shell structured catalyst, a preparation method and use thereof.

BACKGROUND

Hydrogen cyanide (HCN) and arsine ($AsH_3$) as highly toxic gases are typical unconventional toxic and harmful pollutants in industrial tail gas. They are extremely harmful to human health and environment. For many years, it is difficult to purify yellow phosphorus tail gas since the tail gas contains various gases in addition to CO which is at a relatively high concentration and which is not effectively used. In order to make full use of the CO, it is necessary to treat the other gases in the yellow phosphorus tail gas such as $COS$, $CS_2$, $H_2S$, $PH_3$, HCN and $AsH_3$. At present, researches on treatment of $COS$, $CS_2$, $H_2S$ and $PH_3$ and the like have achieved a relatively great progress, but there are few researches on treatment of highly toxic and harmful HCN and $AsH_3$ gases.

Currently, methods for removing HCN mainly include absorption method, adsorption method, combustion method, catalytic oxidation method, catalytic hydrolysis method and the like. The absorption method is currently the most widely used and most mature method in the industry. It is mainly implemented by introducing a tail gas into an alkaline solution for absorption to generate $CN^-$, then desorbing and recovering cyanide. However, this method has an unstable effect, and the $CN^-$ transferred to a liquid phase increases an environmental risk. The adsorption method mainly uses an adsorbent to absorb a HCN gas, thereby reducing HCN gas emission. However, the adsorbent cannot decompose HCN, which is easy to cause secondary pollution. The combustion method mostly uses a precious metal as an active component of catalyst, increasing preparation cost of the catalyst. Moreover, selectivity of products after combustion is poor and produced nitrogen oxides are main components of photochemical smog, which are likely to cause serious pollution to the atmosphere. The catalytic oxidation method mainly adopts a catalytic oxidation reaction between HCN and oxygen in the presence of a catalyst to generate $NO_x$ and $CO_x$. The products contain a low content of nitrogen, and still cause certain pollution to the environment. The catalytic hydrolysis method refers to a hydrolysis reaction of HCN in the presence of water vapor and catalyst within a certain range of temperature, which generates $NH_3$ and CO. At present, $AsH_3$ is removed mainly by chemical absorption method, direct combustion method and catalytic oxidation method. The chemical absorption method is an earliest adopted method which removes $AsH_3$ by a redox reaction between a relatively strong oxidizing oxide and $AsH_3$. However, due to serious corrosion of equipment and secondary pollution of absorption liquid, this method is restricted in application. The direct combustion method requires a large amount of methane and propane as combustion aids when $AsH_3$ is at a low concentration. Moreover, combustion energy is difficult to recycle. The catalytic oxidation method refers to oxidation of $AsH_3$ to $As_2O_3$ in the presence of $O_2$ and catalyst. An obtained product can be used to extract elemental arsenic which is a raw material for smelting arsenic alloys and manufacturing semiconductors.

Currently, there is no technology that can effectively remove HCN and $AsH_3$ at the same time with a low cost, a stable effect, and no secondary pollution.

SUMMARY

An objective of the present disclosure is to provide a core-shell structured catalyst, a preparation method and use thereof. The core-shell structured catalyst of the present disclosure can enable effective removal of HCN and $AsH_3$ at the same time with a stable effect, a low cost, and no secondary pollution.

To achieve the above objective of the present disclosure, the present disclosure provides the following technical solutions:

The present disclosure provides a core-shell structured catalyst for simultaneous removal of HCN and $AsH_3$ by means of catalytic hydrolysis-oxidation coupling, including a metal oxide-molecular sieve as a core, and porous silica ($SiO_2$) as a shell, where the metal oxide-molecular sieve includes a molecular sieve and a metal oxide loaded on the molecular sieve, the metal oxide includes an oxide of a first metal and an oxide of a second metal, the first metal is Fe, Cu, Ti, Ni or Mn, and the second metal is Ce or La.

Preferably, a total mass of the first metal and the second metal in the metal oxide may be 0.5-40% of the mass of the molecular sieve.

Preferably, a molar ratio of the first metal to the second metal may be (0.1-10):1.

The present disclosure provides a method for preparing the core-shell structured catalyst of the above solution, including the following steps:

step (1): immersing a molecular sieve in a mixed salt solution of a salt of a first metal and a salt of a second metal, carrying out rotary evaporating immersion until a solvent is evaporated to dryness, to obtain a metal ion loaded molecular sieve, where the first metal is Fe, Cu, Ti, Ni or Mn and the second metal is Ce or La;

step (2): carrying out a first roasting of the metal ion loaded molecular sieve to obtain a metal oxide-molecular sieve;

step (3): mixing the metal oxide-molecular sieve, water and ethanol, adjusting pH of resulted mixed solution to 11, adding tetraethyl orthosilicate (TEOS), and carrying out a hydrothermal reaction to obtain a core-shell structured catalyst for simultaneous removal of HCN and $AsH_3$ by means of catalytic hydrolysis-oxidation coupling.

Preferably, step (3) may be replaced with step (3'): mixing the metal oxide-molecular sieve, surfactant, water and ethanol, adjusting pH of resulted mixed solution to 11, adding TEOS, carrying out a hydrothermal reaction, and carrying out a second roasting of solid product of the hydrothermal reaction to obtain a core-shell structured catalyst for simultaneous removal of HCN and $AsH_3$ by means of catalytic hydrolysis-oxidation coupling.

Preferably, in step (2), the first roasting may be carried out at 200-900° C. for 1-12 h.

Preferably, in step (3'), the second roasting may be carried out at 200-900° C. for 1-12 h.

Preferably, in step (3) or step (3'), the hydrothermal reaction may be carried out at 100-180° C. for 10-72 h.

Preferably, in step (3) or step (3'), a volume ratio of the ethanol to the water may be 4:1, a volume ratio of the water to the TEOS may be (1-6):1, and a solid-to-liquid ratio of the metal oxide-molecular sieve to the TEOS may be (1-6) g:(10-20) mL.

The present disclosure provides a method for treating an industrial tail gas containing both HCN and $AsH_3$, including the following steps: placing a catalyst in a fixed bed reactor, passing an industrial tail gas to be treated into the fixed bed reactor, and carrying out catalytic hydrolysis-oxidation coupled reaction, where the catalyst is the core-shell structured catalyst of the above solution or a core-shell structured catalyst prepared by the method described in the above solution.

The present disclosure provides a core-shell structured catalyst for simultaneous removal of HCN and $AsH_3$ by means of catalytic hydrolysis-oxidation coupling, including a metal oxide-molecular sieve as a core, and porous $SiO_2$ as a shell, where the metal oxide-molecular sieve includes a molecular sieve and a metal oxide loaded on the molecular sieve, the metal oxide includes an oxide of a first metal and an oxide of a second metal, the first metal is Fe, Cu, Ti, Ni or Mn, and the second metal is Ce or La.

In the present disclosure, the molecular sieve is used as a carrier to load the metal oxide, which greatly improves dispersion of the metal oxide, thereby facilitating action of the metal oxide. The metal oxide includes oxides of the first metal and the second metal where the first metal is Fe, Cu, Ti, Ni or Mn and the second metal is Ce or La. The oxide of the first metal is an active component responsible for catalytic hydrolysis of HCN in a hydrolysis process: $HCN + H_2O \rightarrow NH_3 + CO$. The oxide of the second metal is an active component responsible for catalytic oxidation of $AsH_3$ and $NH_3$ (a product of HCN hydrolysis) in oxidation processes: $NH_3 + O_2 \rightarrow N_2$ and $AsH_3 + O_2 \rightarrow As_xO_y + H_2O$. Accordingly, simultaneous removal of cyanide and arsenic is achieved. Reaction products of the present disclosure are mainly $N_2$, $As_xO_y$ and $H_2O$, which will not cause secondary pollution. In the present disclosure, a layer of porous $SiO_2$ is coated outside the core of metal oxide-molecular sieve. The $SiO_2$ being non-toxic and chemically inert can prevent the catalyst from toxication, so that HCN and $AsH_3$ can be effectively removed over a long time with a stable effect.

Moreover, in the present disclosure, a carrier in the catalyst is molecular sieve which is widely used and relatively inexpensive, the active components of the catalyst are relatively common transition metals and rare earth metals, and the shell adopts $SiO_2$ which can be obtained from abundant sources with cost effective prices, which greatly reduces preparation cost of the catalyst.

The core-shell structured catalyst of the present disclosure for use in simultaneous removal of HCN and $AsH_3$ in a hydrolysis-oxidation coupling method has an excellent catalytic effect and a higher removal efficiency compared with the traditional HZSM-5 molecular sieve for use in removal by adsorption.

The present disclosure provides a method for preparing the core-shell structured catalyst described in the above solution where rotary evaporation is implemented during immersion. Compared with a traditional immersion process, the method of the present disclosure is simple and easy to operate and ensures more uniform immersion.

DETAILED DESCRIPTION

The present disclosure provides a core-shell structured catalyst for simultaneous removal of HCN and $AsH_3$ by means of catalytic hydrolysis-oxidation coupling, including a metal oxide-molecular sieve as a core, and porous $SiO_2$ as a shell, where the metal oxide-molecular sieve includes a molecular sieve and a metal oxide loaded on the molecular sieve, the metal oxide includes an oxide of a first metal and an oxide of a second metal, the first metal is Fe, Cu, Ti, Ni or Mn, and the second metal is Ce or La.

In the present disclosure, the core-shell structured catalyst includes a metal oxide-molecular sieve as a core, where the metal oxide-molecular sieve includes a molecular sieve and a metal oxide loaded on the molecular sieve.

In the present disclosure, the metal oxide includes an oxide of a first metal and an oxide of a second metal. In the present disclosure, the first metal may be Fe, Cu, Ti, Ni or Mn, and preferably Fe, Cu or Ni. In the present disclosure, the oxide of the first metal may be an active component responsible for catalytic hydrolysis of HCN in a hydrolysis process of $HCN + H_2O \rightarrow NH_3 + CO$. The second metal may be Ce or La. The oxide of the second metal may be an active component responsible for catalytic oxidation of $AsH_3$ and $NH_3$ (a product of HCN hydrolysis) in oxidation processes: $NH_3 + O_2 \rightarrow N_2$ and $AsH_3 + O_2 \rightarrow As_xO_y + H_2O$. The oxide of the first metal together with the oxide of the second metal in the present disclosure enables simultaneous removal of cyanide and arsenic.

In the present disclosure, a molar ratio of the first metal to the second metal may be preferably (0.1-10):1, more preferably (1-7):1, and still more preferably (2-5):1. In the present disclosure, a total mass of the first metal and the second metal in the metal oxide may be preferably 0.5-40%, more preferably 5-35%, still more preferably 10-30% and most preferably 15-25% of the mass of the molecular sieve. In embodiments of the present disclosure, when the first metal is Fe, the second metal is Ce; when the first metal is Cu, the second metal is Ce or La; and when the first metal is Ni, the second metal is Ce.

In the present disclosure, the molecular sieve may be preferably HZSM-5 molecular sieve with a silicon-to-aluminum ratio of preferably (25-50):1, more preferably (30-40):1.

In the present disclosure, the metal oxide may be on a surface or in a pore of the molecular sieve, which greatly improves dispersion of the metal oxide, thereby facilitating action of the metal oxide.

In the present disclosure, the core-shell structured catalyst includes porous $SiO_2$ as a shell. In the present disclosure, the porous $SiO_2$ may be preferably a mesoporous $SiO_2$. When the core-shell structured catalyst of the present disclosure is in use, a reaction gas enters an inner layer of the catalyst through a pore structure of the $SiO_2$ to contact the metal oxide.

In the present disclosure, porous $SiO_2$ is coated outside the core of metal oxide-molecular sieve. The $SiO_2$ being non-toxic and chemically inert can prevent the catalyst from toxication, so that HCN and $AsH_3$ can be effectively removed over a long time with a stable effect.

The present disclosure provides a method for preparing the core-shell structured catalyst of the above solution, including the following steps:

step (1): immersing a molecular sieve in a mixed salt solution of a salt of a first metal and a salt of a second metal, carrying out rotary evaporating immersion until a solvent is evaporated to dryness, to obtain a metal ion loaded molecular sieve, where the first metal is Fe, Cu, Ti, Ni or Mn and the second metal is Ce or La;

step (2): carrying out a first roasting of the metal ion loaded molecular sieve to obtain a metal oxide-molecular sieve;

step (3): mixing the metal oxide-molecular sieve, water and ethanol, adjusting pH of resulted mixed solution to 11, adding TEOS, and carrying out a hydrothermal reaction to obtain a core-shell structured catalyst for simultaneous removal of HCN and $AsH_3$ by means of catalytic hydrolysis-oxidation coupling.

In the present disclosure, the materials used are all commercially available products well known in the art, unless otherwise specified.

The present disclosure may be implemented by immersing a molecular sieve in a mixed salt solution of a salt of a first metal and a salt of a second metal, carrying out rotary evaporating immersion until a solvent is evaporated to dryness, to obtain a metal ion loaded molecular sieve.

In the present disclosure, the molecular sieve may be preferably HZSM-5 molecular sieve with a silicon-to-aluminum ratio of preferably (25-50):1, more preferably (30-40):1. In the present disclosure, the HZSM-5 molecular sieve is preferably dried in an electric air blast drying oven at 105° C. before immersion.

In the present disclosure, the mixed salt solution of a salt of a first metal and a salt of a second metal may be preferably obtained by dissolving a salt of a first metal and a salt of a second metal in water. In the present disclosure, the first metal may be Fe, Cu, Ti, Ni or Mn and the second metal may be Ce or La. In the present disclosure, the salt of a first metal and the salt of a second metal may be independently and preferably a metal nitrate, a metal sulfate or a metal chloride, for example, $Fe_2(SO_4)_3$, $Ce(NO_3)_3 \cdot 6H_2O$, $Cu(NO_3)_2 \cdot 3H_2O$, $Ni(NO_3)_2 \cdot 6H_2O$ and $La(NO_3)_3 \cdot 6H_2O$.

In the present disclosure, amounts of the salt of a first metal and the salt of a second metal are determined by contents of the first metal and the second metal in the core-shell structured catalyst.

The present disclosure has no special requirements on concentration of the mixed salt solution, and any concentration can be used. The present disclosure has no special requirements on amount of the mixed salt solution used, as long as the molecular sieve can be completely immersed in the mixed salt solution where a total mass of the first metal and the second metal is 0.5-40% of the mass of the molecular sieve.

In the present disclosure, after the molecular sieve is placed in the mixed salt solution of a salt of a first metal and a salt of a second metal, stirring is preferably carried out at room temperature for 0.5-24 h before rotary evaporating immersion. The present disclosure has no special requirements on stirring conditions, as long as the molecular sieve and the mixed salt solution are uniformly mixed. In the present disclosure, stirring at room temperature for 0.5-24 hours is beneficial for uniformity of metal loaded on the molecular sieve carrier.

In the present disclosure, the rotary evaporating immersion is preferably carried out in a rotary evaporator. The rotary evaporating immersion is carried out at preferably 70-90° C., and more preferably 80° C. In the present disclosure, during the rotary evaporating immersion, metal ions are loaded on the molecular sieve carrier while the solvent is continuously evaporated. In the present disclosure, rotary evaporation is implemented during immersion. Compared with a traditional immersion process, the method of the present disclosure is simple and easy to operate and ensures more uniform immersion.

After the solvent is evaporated to dryness, there is still a small amount of water in the remaining substances. In the present disclosure, the remaining substances are preferably put in an air blast drying oven at 50-100° C. for 12 h to obtain a metal ion loaded molecular sieve.

After the metal ion loaded molecular sieve is obtained, the present disclosure is implemented by carrying out a first roasting of the metal ion loaded molecular sieve to obtain a metal oxide-molecular sieve.

In the present disclosure, the first roasting may be carried out at preferably 200-900° C., more preferably 300-800° C., and still more preferably 400-650° C. for preferably 1-12 h, more preferably 3-10 h, and still more preferably 5-8 h. In the present disclosure, the first roasting is preferably carried out in an air atmosphere. In the present disclosure, during the first roasting, the metals on the molecular sieve carrier are oxidized to metal oxides.

After the metal oxide-molecular sieve is obtained, the present disclosure is implemented by mixing the metal oxide-molecular sieve, water and ethanol, adjusting pH of resulted mixed solution to 11, adding TEOS, and carrying out a hydrothermal reaction to obtain a core-shell structured catalyst for simultaneous removal of HCN and $AsH_3$ by means of catalytic hydrolysis-oxidation coupling.

The present disclosure has no special requirements on mode of mixing the metal oxide-molecular sieve, water and ethanol, and a mode known in the art which can achieve uniform mixing of the three can be used. In the present disclosure, the ethanol is preferably absolute ethanol. Amounts of the metal oxide-molecular sieve, water and ethanol used will be described later.

In the present disclosure, the adjusting pH of resulted mixed solution to 11 is preferably carried out with ammonia water. The present disclosure has no special requirements on concentration of the ammonia water, as long as the pH of the mixed solution can be adjusted to 11. In the present disclosure, the pH of the mixed solution is adjusted to 11 to provide a suitable environment for subsequent hydrolysis of TEOS.

In the present disclosure, after the adjusting pH, the solution is ultrasonically dispersed for 0.5-10 h, and then added with TEOS to carry out a hydrothermal reaction. In the present disclosure, ultrasound is used to disperse metal oxide-molecular sieve uniformly, thereby facilitating uniform coating of $SiO_2$.

In the present disclosure, a volume ratio of the ethanol to the water may be preferably 4:1. A volume ratio of the water to the TEOS may be preferably (1-6):1 and more preferably (1.25-5):1. A solid-to-liquid ratio of the metal oxide-molecular sieve to the TEOS is preferably (1-6) g:(10-20) mL, and more preferably (2-5) g:(10-20) mL.

In the present disclosure, the TEOS may be preferably added by dripping. The present disclosure has no special requirements on dripping rate as long as addition is carried out dropwise. In the present disclosure, addition by dripping ensures more uniform dispersion of $SiO_2$, preventing agglomeration. In the present disclosure, the TEOS may be added under stirring. The present disclosure has no special requirements on stirring conditions, and stirring conditions well known in the art can be used.

In the present disclosure, after the TEOS is added, an obtained system is preferably further stirred for 0.5-24 h. In the present disclosure, during dripping the TEOS and stirring after addition, the TEOS is gradually hydrolyzed to $SiO_2$.

In the present disclosure, after the stirring is completed, an obtained system is transferred to an reaction kettle to carry out a hydrothermal reaction.

In the present disclosure, the hydrothermal reaction may be carried out at preferably 100-180° C., more preferably 110-170° C., and still more preferably 120-150 h. The hydrothermal reaction may be carried out for preferably 10-72 h, and more preferably 12-48 h. In the present disclosure, during the hydrothermal reaction, $SiO_2$ crystallizes and uniformly coats a surface of the metal oxide-molecular sieve to form a porous $SiO_2$ shell.

In the present disclosure, after the hydrothermal reaction is completed, a solid product of the hydrothermal reaction is preferably subjected to washing, drying, tableting, grinding and screening in sequence to obtain a core-shell structured catalyst for simultaneous removal of HCN and $AsH_3$ by means of catalytic hydrolysis-oxidation coupling.

In the present disclosure, the washing is preferably washing with deionized water for 3 times and with absolute ethanol for 3 times in sequence. The drying is preferably drying at 50-100° C. overnight.

The present disclosure has no special requirements on tableting, grinding and screening processes, and tableting, grinding and screening processes well known in the art can be used. In the present disclosure, a screened core-shell structured catalyst may preferably have a particle size of 40-60 mesh.

In the present disclosure, the core-shell structured catalyst can also be prepared in the presence of a surfactant. When a surfactant is used, the step "mixing the metal oxide-molecular sieve, water and ethanol, adjusting pH of resulted mixed solution to 11, adding TEOS, and carrying out a hydrothermal reaction to obtain a core-shell structured catalyst for simultaneous removal of HCN and $AsH_3$ by means of catalytic hydrolysis-oxidation coupling" may be replaced with:

mixing the metal oxide-molecular sieve, surfactant, water and ethanol, adjusting pH of resulted mixed solution to 11, adding TEOS, carrying out a hydrothermal reaction, and carrying out a second roasting of solid product of the hydrothermal reaction to obtain a core-shell structured catalyst for simultaneous removal of HCN and $AsH_3$ by means of catalytic hydrolysis-oxidation coupling.

In the present disclosure, the surfactant may be preferably cetyltrimethylammonium bromide (CTAB) or polyvinylpyrrolidone, more preferably CTAB. A mass ratio of the metal oxide-molecular sieve to the surfactant may be preferably (1-4):1, more preferably (1.3-3):1, and still more preferably (1.5-2):1.

In the present disclosure, after addition of the surfactant, amounts of the other substances used, the adjusting pH, the adding TEOS and the carrying out a hydrothermal reaction are the same as those when no surfactant is added, and are not repeated here.

In the present disclosure, the added surfactant helps $SiO_2$ to form a more uniform spherical coating during the hydrothermal reaction, thereby helping to prevent the core-shell structured catalyst from toxication. In the case of using a surfactant, the solid product of the hydrothermal reaction obtained in the present disclosure contains the surfactant.

In the present disclosure, after the hydrothermal reaction is completed, the solid product of the hydrothermal reaction is preferably subjected to washing and drying in sequence, and finally a second roasting. In the present disclosure, the washing is preferably washing with deionized water for 3 times and with absolute ethanol for 3 times in sequence. The drying is preferably drying at 50-100° C. overnight.

In the present disclosure, the second roasting may be carried out at preferably 200-900° C., more preferably 300-800° C., and still more preferably 400-650° C. for preferably 1-12 h, more preferably 3-10 h, and still more preferably 5-8 h. In the present disclosure, the second roasting may be preferably carried out in an air atmosphere. In the present disclosure, the surfactant is removed during the second roasting.

In the present disclosure, after the second roasting is completed, a roasted product is subjected to tableting, grinding and screening in sequence to obtain a core-shell structured catalyst for simultaneous removal of HCN and $AsH_3$ by means of catalytic hydrolysis-oxidation coupling. The present disclosure has no special requirements on tableting, grinding and screening processes, and tableting, grinding and screening processes well known in the art can be used. In the present disclosure, a screened core-shell structured catalyst may preferably have a particle size of 40-60 mesh.

The present disclosure provides a method for treating an industrial tail gas containing both HCN and $AsH_3$, including the following steps: placing a catalyst in a fixed bed reactor, passing an industrial tail gas to be treated into the fixed bed reactor, and carrying out catalytic hydrolysis-oxidation coupled reaction, where the catalyst is the core-shell structured catalyst of the above solution or a core-shell structured catalyst prepared by the method described in the above solution.

The present disclosure has no special requirements on source of the industrial tail gas, and an industrial tail gas containing HCN and $AsH_3$ well known in the art may be applicable. In the present disclosure, the industrial tail gas may be preferably an industrial tail gas containing HCN, $AsH_3$ and rich CO, for example, yellow phosphorus tail gas. The present disclosure has no special requirements on concentrations of HCN and $AsH_3$ in the industrial tail gas, and any concentration can be used. In the present disclosure, an $O_2$ content in the industrial tail gas may be preferably 0.1-2%, more preferably 0.5-1.5%. The industrial tail gas may have a relative humidity of preferably 10-60%, more preferably 20-50%.

In the present disclosure, the catalytic hydrolysis-oxidation coupled reaction may be carried out at preferably 50-250° C., more preferably 100-220° C., still more preferably 130-200° C. with a space velocity of preferably 5,000-100,000 $h^{-1}$, more preferably 10,000-50,000 $h^{-1}$.

The core-shell structured catalyst and preparation method and use thereof provided by the present disclosure will be described in detail below with reference to embodiments, but these embodiments should not be construed as limiting the scope of the present disclosure.

Example 1

In this example, a molar ratio of two metal elements Fe and Ce was 7:3, and a mass of the two was 20 wt % of that of an HZSM-5 molecular sieve carrier.

Step (1): 3 g of commercially available HZSM-5 molecular sieve was taken and dried in an electric air blast drying oven at 105° C. for later use. 1.035 g $Fe_2(SO_4)_3$ and 0.9 g $Ce(NO_3)_3 \cdot 6H_2O$ were taken and dissolved in 50 mL of deionized water to prepare a mixed solution of $Fe_2(SO_4)_3$ solution and $Ce(NO_3)_3$ solution. Then, dried HZSM-5 molecular sieve was immersed in the mixed solution containing $Fe_2(SO_4)_3$ solution and $Ce(NO_3)_3$ solution, stirred uniform at room temperature for 4 h, and put into a rotary evaporator for further immersion. Obtained powders were taken out, and dried in an air blast drying oven at 100° C. for 12 h to obtain a metal ion loaded molecular sieve.

Step (2): Metal ion loaded molecular sieve powders obtained in step (1) were put into a muffle furnace at 550° C. for a first roasting for 6 h to obtain a metal oxide-molecular sieve denoted as $Fe_2O_3$—$CeO_2$/HZSM-5.

Step (3): 3 g of $Fe_2O_3$—$CeO_2$/HZSM-5 particles for a core and 2 g of CTAB were added into a mixed solution of 50 mL deionized water and 200 mL absolute ethanol. Ammonia water was added to adjust pH to 11. Ultrasonic dispersion was carried out for 2 h. 10 mL of TEOS was added dropwise to an obtained solution and stirred for 6 h. A mixture was transferred to a reaction kettle. A reaction was carried out at 160° C. for 12 h. Washing was carried out with deionized water and absolute ethanol for 3 times respectively and sequentially. Drying was carried out at 100° C. overnight. Obtained powders were put in a muffle furnace at 550° C. for a second roasting for 6 h. Roasted powders were pressed into tablets, ground and screened to obtain a 40-60 mesh core-shell structured catalyst denoted as $Fe_2O_3$—$CeO_2$/HZSM-5@$SiO_2$.

Figure 1:
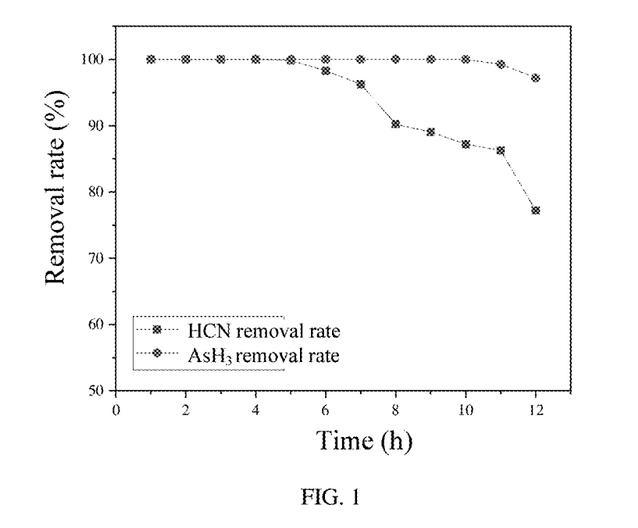
FIG. 1 shows removal rates of HCN and $AsH_3$ with the core-shell structured catalyst $Fe_2O_3$—$CeO_2$/HZSM-5@$SiO_2$ in Example 1 of the present disclosure.

The $Fe_2O_3$—$CeO_2$/HZSM-5@$SiO_2$ core-shell structured catalyst prepared in this example was tested in a Φ 6 mm×10 cm fixed bed quartz reactor for catalytic performance in simultaneous removal of HCN and $AsH_3$ in a mixed gas. Reaction conditions were as follows: concentration of HCN was 80 ppm, concentration of $AsH_3$ was 80 ppm, content of $O_2$ was 0.8%, space velocity was 10,000 $h^{-1}$, reaction temperature was 170° C., relative humidity was 49%, and total flow rate was 100 mL/min. $NH_3$ was not detected at a reaction outlet (since HCN was transformed into ammonia gas during a hydrothermal reaction in the experiment, and the ammonia gas was in turn oxidized. If no ammonia gas was detected, the ammonia gas produced by hydrolysis was proved to be oxidized, showing a better effect of the catalyst), and removal efficiency results of HCN and $AsH_3$ were shown in FIG. 1 with corresponding specific data shown in Table 1. It can be seen from FIG. 1 and Table 1 that, HCN removal rate of 100% can be maintained for 4 h, and $AsH_3$ removal rate of 100% can be maintained for 10 h. This indicated that the $Fe_2O_3$—$CeO_2$/HZSM-5@$SiO_2$ core-shell structured catalyst can enable effective removal of HCN and $AsH_3$ over a long time. Especially, removal of $AsH_3$ was more stable.

Example 2

In this example, a molar ratio of two metal elements Cu and Ce was 4:1, and the two was 10 wt % of an HZSM-5 molecular sieve carrier.

Step (1): 5 g of commercially available HZSM-5 molecular sieve was taken and dried in an electric air blast drying oven at 105° C. for later use. 1.208 g of $Cu(NO_3)_2 \cdot 3H_2O$ and 0.558 g of $Ce(NO_3)_3 \cdot 6H_2O$ were taken and dissolved in 50 mL of deionized water to prepare a mixed solution of $Cu(NO_3)_2$ solution and $Ce(NO_3)_3$ solution. Then, dried HZSM-5 molecular sieve was immersed in the mixed solution containing $Cu(NO_3)_2$ solution and $Ce(NO_3)_3$ solution, stirred uniform at room temperature for 5 h, and put into a rotary evaporator for further immersion. Obtained powders were taken out, and dried in an air blast drying oven at 100° C. for 12 h to obtain a metal ion loaded molecular sieve.

Step (2): The metal ion loaded molecular sieve obtained was put into a muffle furnace at 600° C. for a first roasting for 6 h to obtain a metal oxide-molecular sieve denoted as $CuO$—$CeO_2$/HZSM-5. Step (3): 5 g of $CuO$—$CeO_2$-HZSM-5 and 5 g of CTAB were added into a mixed solution of 100 mL deionized water and 400 mL absolute ethanol. Ammonia water was added to adjust pH to 11. Ultrasonic dispersion was carried out for 2 h. 20 mL of TEOS was added dropwise to an obtained solution and stirred for 6 h. A mixture was transferred to a reaction kettle. A reaction was carried out at 150° C. for 12 h. Washing was carried out with deionized water and absolute ethanol for 3 times respectively and sequentially. Drying was carried out at 100° C. overnight. Obtained powders were put in a muffle furnace at 550° C. for a second roasting for 6 h. Roasted powders were pressed into tablets, ground and screened to obtain a 40-60 mesh core-shell structured catalyst denoted as $CuO$—$CeO_2$/HZSM-5@$SiO_2$.

The $CuO$—$CeO_2$/HZSM-5@$SiO_2$ core-shell structured catalyst prepared in this example was tested in a Φ 6 mm×10 cm fixed bed quartz reactor for catalytic performance in simultaneous removal of HCN and $AsH_3$ in a mixed gas. Reaction conditions were as follows: concentration of HCN was 80 ppm, concentration of $AsH_3$ was 80 ppm, content of $O_2$ was 0.8%, space velocity was 10,000 $h^{-1}$, reaction temperature was 200° C., relative humidity was 49%, and total flow rate was 100 mL/min. $NH_3$ was not detected at a reaction outlet, and removal efficiency results of HCN and $AsH_3$ were shown in FIG. 2 with corresponding specific data shown in Table 2. It can be seen from FIG. 2 and Table 2 that, HCN removal rate of 100% can be maintained for 8 h, and $AsH_3$ removal rate of 100% can be maintained for more than 12 h (the experiment aimed to remove HCN and $AsH_3$ simultaneously, thus, when the HCN removal efficiency decreased, the time at which the $AsH_3$ removal efficiency dropped to below 100% was not determined any more). This indicated that the $CuO$—$CeO_2$/HZSM-5@$SiO_2$ core-shell

TABLE 1

Removal rates of HCN and $AsH_3$ with the core-shell structured catalyst in Example 1 (%)

Figure 2:
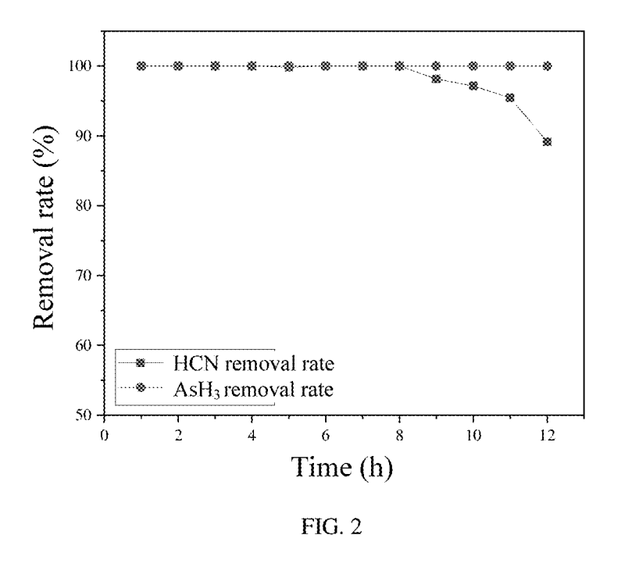
FIG. 2 shows removal rates of HCN and $AsH_3$ with the core-shell structured catalyst CuO—$CeO_2$/HZSM-5@$SiO_2$ in Example 2 of the present disclosure.

| | Time | | | | | | | | | | | |
|---|---|---|---|---|---|---|---|---|---|---|---|---|
| | 1 h | 2 h | 3 h | 4 h | 5 h | 6 h | 7 h | 8 h | 9 h | 10 h | 11 h | 12 h |
| HCN | 100 | 100 | 100 | 100 | 99.9 | 98.3 | 96.2 | 90.2 | 89.0 | 87.2 | 86.3 | 77.2 |
| $AsH_3$ | 100 | 100 | 100 | 100 | 100 | 100 | 100 | 100 | 100 | 100 | 99.2 | 97.2 | structured catalyst can ensure effective removal of HCN and $AsH_3$ over a long time. Especially, removal of $AsH_3$ was more stable.

TABLE 2

Removal rates of HCN and $AsH_3$ with the core-shell structured catalyst in Example 2
(%)

| | Time | | | | | | | | | | | |
|---|---|---|---|---|---|---|---|---|---|---|---|---|
| | 1 h | 2 h | 3 h | 4 h | 5 h | 6 h | 7 h | 8 h | 9 h | 10 h | 11 h | 12h |
| HCN | 100 | 100 | 100 | 100 | 99.9 | 100 | 100 | 100 | 98.2 | 97.2 | 95.5 | 89.2 |
| $AsH_3$ | 100 | 100 | 100 | 100 | 100 | 100 | 100 | 100 | 100 | 100 | 100 | 100 |

Example 3

In this example, a molar ratio of two metal elements Ni and Ce was 3:2, and the two was 15 wt % of an HZSM-5 molecular sieve carrier.

Step (1): 2 g of commercially available HZSM-5 molecular sieve was taken and dried in an electric air blast drying oven at 105° C. for later use. 0.5747 g of $Ni(NO_3)_2.6H_2O$ and 0.5706 g of $Ce(NO_3)_3.6H_2O$ were taken and dissolved in 50 mL of deionized water to prepare a mixed solution of $Ni(NO_3)_2$ solution and $Ce(NO_3)_3$ solution. Then, dried HZSM-5 molecular sieve was immersed in a mixed solution containing $NiSO_4$ solution and $Ce(NO_3)_3$ solution, stirred uniformly at room temperature for 5 h, and put into a rotary evaporator for further immersion. Obtained powders were taken out, and dried in an air blast drying oven at 100° C. for 12 h to obtain a metal ion loaded molecular sieve.

Step (2): The metal ion loaded molecular sieve obtained was put into a muffle furnace at 500° C. for a first roasting for 6 h to obtain $NiO-CeO_2$/HZSM-5.

Step (3): 2 g of NiO—CeO/HZSM-5 and 1.5 g of CTAB were added into a mixed solution of 25 mL deionized water and 100 mL absolute ethanol. Ammonia water was added to adjust pH to 11. Ultrasonic dispersion was carried out for 2 h. 20 mL of TEOS was added dropwise to an obtained solution and stirred for 6 h. A mixture was transferred to a reaction kettle. A reaction was carried out at 170° C. for 12 h. Washing was carried out with deionized water and absolute ethanol for 3 times respectively and sequentially. Drying was carried out at 100° C. overnight. Obtained powders were put in a muffle furnace at 600° C. for a second roasting for 5 h. Roasted powders were pressed into tablets, ground and screened to obtain a 40-60 mesh core-shell structured catalyst denoted as NiO—$CeO_2$/HZSM-5 @SiO.

Figure 3:
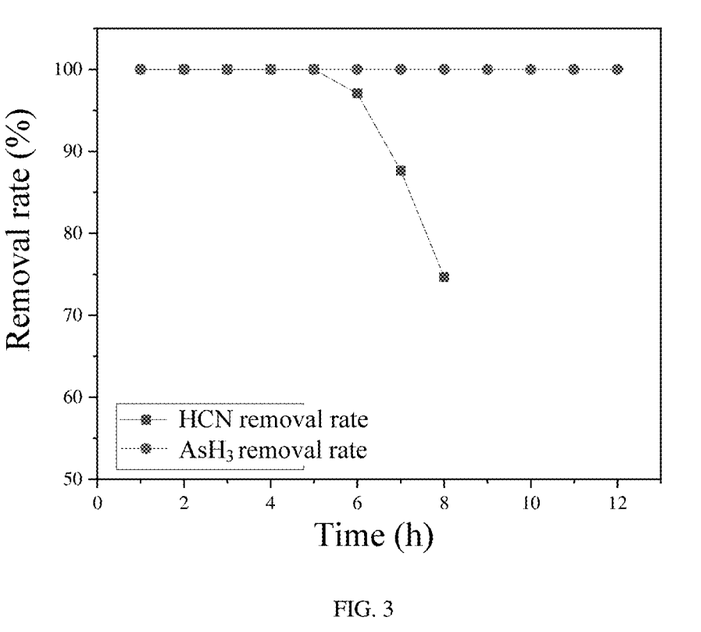
FIG. 3 shows removal rates of HCN and $AsH_3$ with the core-shell structured catalyst NiO—$CeO_2$/HZSM-5 @$SiO_2$ in Example 3 of the present disclosure.

The NiO—$CeO_2$/HZSM-5@$SiO_2$ core-shell structured catalyst prepared in this example was tested in a Φ 6 mm×10 cm fixed bed quartz reactor for catalytic performance in simultaneous removal of HCN and $AsH_3$ in a mixed gas. Reaction conditions were as follows: concentration of HCN was 80 ppm, concentration of $AsH_3$ was 80 ppm, content of $O_2$ was 0.9%, space velocity was 10,000 $h^{-1}$, reaction temperature was 200° C., relative humidity was 49%, and total flow rate was 100 mL/min. $NH_3$ was not detected at a reaction outlet, and removal efficiency results of HCN and $AsH_3$ were shown in FIG. 3 with corresponding specific data shown in Table 3. It can be seen from FIG. 3 and Table 3 that, HCN removal rate of 100% can be maintained for 5 h, and $AsH_3$ removal rate of 100% can be maintained for more than 12 h (the experiment aimed to remove HCN and $AsH_3$ simultaneously, thus, when the HCN removal efficiency decreased, the time at which the $AsH_3$ removal efficiency dropped to below 100% was not determined any more). This indicated that the NiO—$CeO_2$-HZSM-5@$SiO_2$ core-shell structured catalyst can enable effective removal of HCN and $AsH_3$ over a long time. Especially, removal of $AsH_3$ was more stable.

TABLE 3

Removal rates of HCN and $AsH_3$ with the core-shell structured catalyst in Example 3
(%)

| | Time | | | | | | | | | | | |
|---|---|---|---|---|---|---|---|---|---|---|---|---|
| | 1 h | 2 h | 3 h | 4 h | 5 h | 6 h | 7 h | 8 h | 9 h | 10 h | 11 h | 12 h |
| HCN | 100 | 100 | 100 | 100 | 100 | 97.1 | 87.6 | 74.7 | — | — | — | — |
| $AsH_3$ | 100 | 100 | 100 | 100 | 100 | 100 | 100 | 100 | 100 | 100 | 100 | 100 |

Example 4

In this example, a molar ratio of two metal elements Cu and La was 4:1, and the two was 25 wt % of an HZSM-5 molecular sieve carrier.

Step (1): 3 g of commercially available HZSM-5 molecular sieve was taken and dried in an electric air blast drying oven at 105° C. for later use. 1.835 g of $Cu(NO_3)_2.3H_2O$ and 0.69 g of $La(NO_3)_3.6H_2O$ were taken and dissolved in 50 mL of deionized water to prepare a mixed solution of $Cu(NO_3)_2$ solution and $La(NO_3)_3$ solution. Then, dried HZSM-5 molecular sieve was immersed in a mixed solution containing $CuSO_4$ solution and $La(NO_3)_3$ solution, stirred uniformly at room temperature for 8 h, and put into a rotary evaporator for further immersion. Obtained powders were taken out, and dried in an air blast drying oven at 100° C. for 12 h to obtain a metal ion loaded molecular sieve.

Step (2): The metal ion loaded molecular sieve obtained was put into a muffle furnace at 600° C. for a first roasting for 6 h to obtain CuO—$La_2O_3$/HZSM-5.

Step (3): 3 g of CuO—$La_2O_3$/HZSM-5 and 2 g of CTAB were added into a mixed solution of 50 mL deionized water and 200 mL absolute ethanol. Ammonia water was added to adjust pH to 11. Ultrasonic dispersion was carried out for 2 h. 10 mL of TEOS was added dropwise to an obtained solution and stirred for 6 h. A mixture was transferred to a reaction kettle. A reaction was carried out at 80° C. for 24 h. Washing was carried out with deionized water and absolute ethanol for 3 times respectively and sequentially. Drying was carried out at 100° C. overnight. Obtained powders were put in a muffle furnace at 550° C. for a second roasting for 6 h. Roasted powders were pressed into tablets, ground and screened to obtain a 40-60 mesh core-shell structured catalyst denoted as CuO—La$_2$O$_3$/HZSM-5@SiO$_2$.

Figure 4:
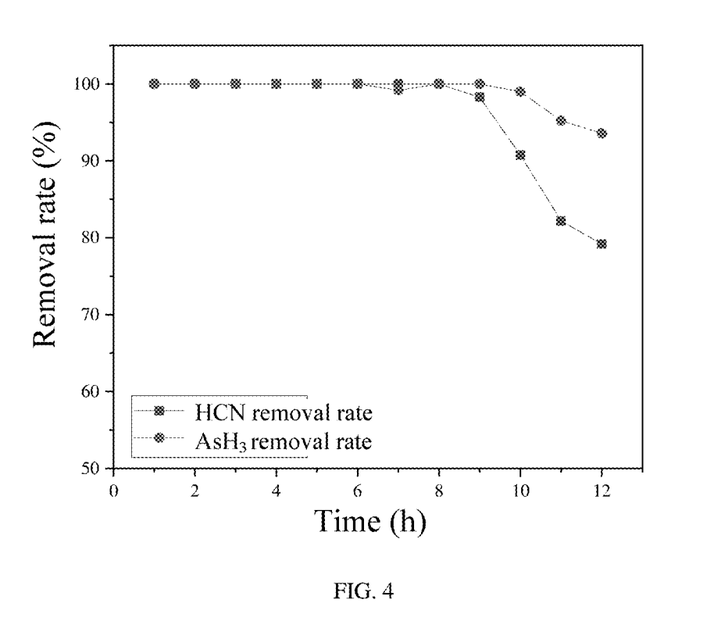
FIG. 4 shows removal rates of HCN and $AsH_3$ with the core-shell structured catalyst CuO—$La_2O_3$/HZSM-5@$SiO_2$ in Example 4 of the present disclosure.

The CuO—La$_2$O$_3$/HZSM-5@SiO$_2$ core-shell structured catalyst prepared in this example was tested in a Φ 6 mm×10 cm fixed bed quartz reactor for catalytic performance in simultaneous removal of HCN and AsH$_3$ in a mixed gas. Reaction conditions were as follows: concentration of HCN was 80 ppm, concentration of AsH$_3$ was 80 ppm, content of O$_2$ was 1%, space velocity was 10,000 h$^{-1}$, reaction temperature was 150° C., relative humidity was 49%, and total flow rate was 100 mL/min. NH$_3$ was not detected at a reaction outlet, and removal efficiency results of HCN and AsH$_3$ were shown in FIG. 4 with corresponding specific data shown in Table 4. It can be seen from FIG. 4 and Table 4 that, HCN removal rate of 100% can be maintained for 8 h, and AsH$_3$ removal rate of 100% can be maintained for 9 h. This indicated that the CuO—La$_2$O$_3$/HZSM-5@SiO$_2$ core-shell structured catalyst can enable effective removal of HCN and AsH$_3$. Especially, removal of AsH$_3$ was more stable.

TABLE 4

Removal rates of HCN and AsH$_3$ with the core-shell structured catalyst in Example 4 (%)

| | Time | | | | | | | | | | | |
|---|---|---|---|---|---|---|---|---|---|---|---|---|
| | 1 h | 2 h | 3 h | 4 h | 5 h | 6 h | 7 h | 8 h | 9 h | 10 h | 11 h | 12 h |
| HCN | 100 | 100 | 100 | 100 | 100 | 100 | 100 | 100 | 98.3 | 90.8 | 82.26 | 79.2 |
| AsH$_3$ | 100 | 100 | 100 | 100 | 100 | 100 | 99.2 | 100 | 100 | 99.0 | 95.2 | 93.6 |

Example 5

In this example, a molar ratio of two metal elements Cu and Ce was 4:1, and the two was 10 wt % of an HZSM-5 molecular sieve carrier.

Step (1): 5 g of commercially available HZSM-5 molecular sieve was taken and dried in an electric air blast drying oven at 105° C. for later use. 1.208 g of Cu(NO$_3$)$_2$.3H$_2$O and 0.558 g of Ce(NO$_3$)$_3$.6H$_2$O were taken and dissolved in 50 mL of deionized water to prepare a mixed solution of Cu(NO$_3$)$_2$ solution and Ce(NO$_3$)$_3$ solution. Then, dried HZSM-5 molecular sieve was immersed in the mixed solution containing Cu(NO$_3$)$_2$ solution and Ce(NO$_3$)$_3$ solution, stirred uniformly at room temperature for 8 h, and put into a rotary evaporator for further immersion. Obtained powders were taken out, and dried in an air blast drying oven at 100° C. for 12 h to obtain a metal ion loaded molecular sieve.

Step (2): The metal ion loaded molecular sieve obtained was put into a muffle furnace at 550° C. for roasting for 5 h to obtain a metal oxide-molecular sieve denoted as CuO—CeO$_2$/HZSM-5.

Step (3): 3 g of CuO—CeO$_2$/HZSM-5 was added into a mixed solution of 100 mL deionized water and 400 mL absolute ethanol. Ammonia water was added to adjust pH to 11. Ultrasonic dispersion was carried out for 2 h. 10 mL of TEOS was added dropwise to an obtained solution and stirred for 5 h. A mixture was transferred to a reaction kettle. A reaction was carried out at 120° C. for 12 h. Washing was carried out with deionized water and absolute ethanol for 3 times respectively and sequentially. Drying was carried out at 100° C. overnight. Obtained powders were pressed into tablets, ground and screened to obtain a 40-60 mesh core-shell structured catalyst denoted as CuO—CeO$_2$/HZSM-5@SiO$_2$.

Comparative Example 1

In this example, a metal element Cu was 10 wt % of an HZSM-5 molecular sieve carrier.

Step (1): 5 g of commercially available HZSM-5 molecular sieve was taken and dried in an electric air blast drying oven at 105° C. for later use. 1.8875 g of Cu(NO$_3$)$_2$.3H$_2$O was taken and dissolved in 50 mL of deionized water to prepare a Cu(NO$_3$)$_2$ solution. Then, dried HZSM-5 molecular sieve was immersed in a solution containing CuSO$_4$, stirred uniformly at room temperature for 5 h, and put into a rotary evaporator for further immersion. Obtained powders were taken out, and dried in an air blast drying oven at 100° C. for 12 h to obtain a metal ion loaded molecular sieve.

Step (2): The metal ion loaded molecular sieve obtained was put into a muffle furnace at 550° C. for roasting for 5 h to obtain CuO/HZSM-5.

Figure 5:
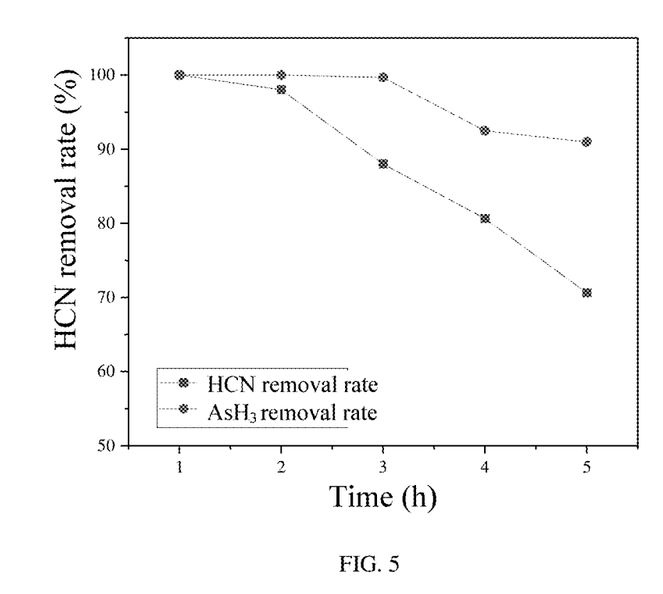
FIG. 5 shows removal rates of HCN and $AsH_3$ with the catalyst of Comparative Example 1 of the present disclosure.

The CuO/HZSM-5 catalyst prepared in Comparative Example 1 was tested in a Φ 6 mm×10 cm fixed bed quartz reactor for catalytic performance in simultaneous removal of HCN and AsH$_3$ in a mixed gas. Reaction conditions were as follows: concentration of HCN was 80 ppm, concentration of AsH$_3$ was 80 ppm, content of O$_2$ was 0.8%, space velocity was 10,000 h$^{-1}$, reaction temperature was 150° C., relative humidity was 49%, and total flow rate was 100 mL/min. Removal efficiency results of HCN and AsH$_3$ were shown in FIG. 5 with corresponding specific data shown in Table 5. It can be seen from FIG. 5 and Table 5 that, HCN removal rate of 100% can be maintained for 1 h, and AsH$_3$ removal rate of 100% can be maintained for 2 h. This indicated that the CuO/HZSM-5 catalyst had certain effect in removing HCN and AsH$_3$ but the effect was not ideal compared with that of the core-shell structured material prepared by the present disclosure.

TABLE 5

Removal rates of HCN and AsH$_3$ with the catalyst of Comparative Example 1 (%)

| Time | 1 h | 2 h | 3 h | 4 h | 5 h |
|---|---|---|---|---|---|
| HCN | 100 | 98.0 | 88.0 | 80.6 | 70.6 |
| AsH$_3$ | 100 | 100 | 99.7 | 92.5 | 91.0 |

It can be seen from the above Examples and Comparative Example that, the core-shell structured catalyst provided by

What is claimed is:

1. A core-shell structured catalyst for simultaneous removal of hydrogen cyanide (HCN) and arsine ($AsH_3$) by means of catalytic hydrolysis-oxidation coupling, comprising a metal oxide-molecular sieve as a core and porous silica ($SiO_2$) as a shell, wherein the metal oxide-molecular sieve comprises a molecular sieve and a metal oxide loaded on the molecular sieve, the metal oxide comprises an oxide of a first metal and an oxide of a second metal, the first metal is Fe, Cu, Ti, Ni or Mn, and the second metal is Ce or La.

2. The core-shell structured catalyst according to claim 1, wherein a total mass of the first metal and the second metal in the metal oxide is 0.5-40% of the mass of the molecular sieve.

3. The core-shell structured catalyst according to claim 1, wherein a molar ratio of the first metal to the second metal is (0.1-10):1.

4. The core-shell structured catalyst according to claim 2, wherein a molar ratio of the first metal to the second metal is (0.1-10):1.

5. A method for preparing the core-shell structured catalyst according to claim 1, comprising the following steps:
   step (1): immersing a molecular sieve in a mixed salt solution of a salt of a first metal and a salt of a second metal, carrying out rotary evaporating immersion until a solvent is evaporated to dryness, to obtain a metal ion loaded molecular sieve, wherein the first metal is Fe, Cu, Ti, Ni or Mn and the second metal is Ce or La;
   step (2): carrying out a first roasting of the metal ion loaded molecular sieve to obtain a metal oxide-molecular sieve;
   step (3): mixing the metal oxide-molecular sieve, water and ethanol, adjusting pH of resulted mixed solution to 11, adding tetraethyl orthosilicate (TEOS), and carrying out a hydrothermal reaction to obtain a core-shell structured catalyst for simultaneous removal of HCN and $AsH_3$ by means of catalytic hydrolysis-oxidation coupling.

6. A method for preparing the core-shell structured catalyst according to claim 2, comprising the following steps:
   step (1): immersing a molecular sieve in a mixed salt solution of a salt of a first metal and a salt of a second metal, carrying out rotary evaporating immersion until a solvent is evaporated to dryness, to obtain a metal ion loaded molecular sieve, wherein the first metal is Fe, Cu, Ti, Ni or Mn and the second metal is Ce or La;
   step (2): carrying out a first roasting of the metal ion loaded molecular sieve to obtain a metal oxide-molecular sieve;
   step (3): mixing the metal oxide-molecular sieve, water and ethanol, adjusting pH of resulted mixed solution to 11, adding tetraethyl orthosilicate (TEOS), and carrying out a hydrothermal reaction to obtain a core-shell structured catalyst for simultaneous removal of HCN and $AsH_3$ by means of catalytic hydrolysis-oxidation coupling.

7. A method for preparing the core-shell structured catalyst according to claim 3, comprising the following steps:
   step (1): immersing a molecular sieve in a mixed salt solution of a salt of a first metal and a salt of a second metal, carrying out rotary evaporating immersion until a solvent is evaporated to dryness, to obtain a metal ion loaded molecular sieve, wherein the first metal is Fe, Cu, Ti, Ni or Mn and the second metal is Ce or La;
   step (2): carrying out a first roasting of the metal ion loaded molecular sieve to obtain a metal oxide-molecular sieve;
   step (3): mixing the metal oxide-molecular sieve, water and ethanol, adjusting pH of resulted mixed solution to 11, adding tetraethyl orthosilicate (TEOS), and carrying out a hydrothermal reaction to obtain a core-shell structured catalyst for simultaneous removal of HCN and $AsH_3$ by means of catalytic hydrolysis-oxidation coupling.

8. A method for preparing the core-shell structured catalyst according to claim 4, comprising the following steps:
   step (1): immersing a molecular sieve in a mixed salt solution of a salt of a first metal and a salt of a second metal, carrying out rotary evaporating immersion until a solvent is evaporated to dryness, to obtain a metal ion loaded molecular sieve, wherein the first metal is Fe, Cu, Ti, Ni or Mn and the second metal is Ce or La;
   step (2): carrying out a first roasting of the metal ion loaded molecular sieve to obtain a metal oxide-molecular sieve;
   step (3): mixing the metal oxide-molecular sieve, water and ethanol, adjusting pH of resulted mixed solution to 11, adding tetraethyl orthosilicate (TEOS), and carrying out a hydrothermal reaction to obtain a core-shell structured catalyst for simultaneous removal of HCN and $AsH_3$ by means of catalytic hydrolysis-oxidation coupling.

9. The method according to claim 5, wherein step (3) is replaced with step (3'): mixing the metal oxide-molecular sieve, surfactant, water and ethanol, adjusting pH of resulted mixed solution to 11, adding TEOS, carrying out a hydrothermal reaction, and carrying out a second roasting of solid product of the hydrothermal reaction to obtain a core-shell structured catalyst for simultaneous removal of HCN and $AsH_3$ by means of catalytic hydrolysis-oxidation coupling.

10. The method according to claim 5, wherein in step (2), the first roasting is carried out at 200-900° C. for 1-12 h.

11. The method according to claim 9, wherein in step (3'), the second roasting is carried out at 200-900° C. for 1-12 h.

12. The method according to claim 5, wherein in step (3) or step (3'), the hydrothermal reaction is carried out at 100-180° C. for 10-72 h.

13. The method according to claim 9, wherein in step (3) or step (3'), the hydrothermal reaction is carried out at 100-180° C. for 10-72 h.

14. The method according to claim 5, wherein in step (3) or step (3'), a volume ratio of the ethanol to the water is 4:1, a volume ratio of the water to the TEOS is (1-6):1, and a solid-to-liquid ratio of the metal oxide-molecular sieve to the TEOS is (1-6) g:(10-20) mL.

15. The method according to claim 9, wherein in step (3) or step (3'), a volume ratio of the ethanol to the water is 4:1, a volume ratio of the water to the TEOS is (1-6):1, and a solid-to-liquid ratio of the metal oxide-molecular sieve to the TEOS is (1-6) g:(10-20) mL.

16. A method for treating an industrial tail gas containing both HCN and $AsH_3$, comprising the following steps: placing a catalyst in a fixed bed reactor, passing an industrial tail gas to be treated into the fixed bed reactor, and carrying out catalytic hydrolysis-oxidation coupled reaction, wherein the catalyst is the core-shell structured catalyst according to claim 1.

17. A method for treating an industrial tail gas containing both HCN and $AsH_3$, comprising the following steps: placing a catalyst in a fixed bed reactor, passing an industrial tail gas to be treated into the fixed bed reactor, and carrying out catalytic hydrolysis-oxidation coupled reaction, wherein the catalyst is the core-shell structured catalyst according to claim 2.

18. A method for treating an industrial tail gas containing both HCN and $AsH_3$, comprising the following steps: placing a catalyst in a fixed bed reactor, passing an industrial tail gas to be treated into the fixed bed reactor, and carrying out catalytic hydrolysis-oxidation coupled reaction, wherein the catalyst is the core-shell structured catalyst according to claim 3.

19. A method for treating an industrial tail gas containing both HCN and $AsH_3$, comprising the following steps: placing a catalyst in a fixed bed reactor, passing an industrial tail gas to be treated into the fixed bed reactor, and carrying out catalytic hydrolysis-oxidation coupled reaction, wherein the catalyst is the core-shell structured catalyst according to claim 4.

20. A method for treating an industrial tail gas containing both HCN and $AsH_3$, comprising the following steps: placing a catalyst in a fixed bed reactor, passing an industrial tail gas to be treated into the fixed bed reactor, and carrying out catalytic hydrolysis-oxidation coupled reaction, wherein the catalyst is a core-shell structured catalyst prepared by the method according to claim 5.

\* \* \* \* \*